United States Patent
Lane (10) Patent No.: US 8,978,090 B2
(45) Date of Patent: Mar. 10, 2015

(54) MULTIMEDIA TRANSCODING PROXY SERVER FOR WIRELESS TELECOMMUNICATION SYSTEM

(75) Inventor: Richard Doil Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2514 days.

(21) Appl. No.: 10/798,620

(22) Filed: Mar. 10, 2004

(65) Prior Publication Data

US 2004/0179605 A1 Sep. 16, 2004

Related U.S. Application Data

(60) Provisional application No. 60/454,391, filed on Mar. 12, 2003.

(51) Int. Cl.
| | |
|---|---|
| H04N 7/16 | (2011.01) |
| H04N 21/24 | (2011.01) |
| H04N 21/2343 | (2011.01) |
| H04N 21/258 | (2011.01) |
| H04N 21/2662 | (2011.01) |
| H04N 21/2743 | (2011.01) |
| H04N 21/61 | (2011.01) |

(52) U.S. Cl.
CPC ... *H04N 21/2402* (2013.01); *H04N 21/234363* (2013.01); *H04N 21/234381* (2013.01); *H04N 21/25808* (2013.01); *H04N 21/25891* (2013.01); *H04N 21/2662* (2013.01); *H04N 21/2743* (2013.01); *H04N 21/6131* (2013.01)

USPC .............. 725/145; 725/4; 725/8; 725/115; 725/116; 725/146

(58) Field of Classification Search
USPC ............ 725/145, 4, 8, 115–116, 146
See application file for complete search history.

(56) References Cited

U.S. PATENT DOCUMENTS

| | | | | |
|---|---|---|---|---|
| 5,731,847 | A * | 3/1998 | Tsukagoshi | 348/589 |
| 6,018,369 | A * | 1/2000 | Patterson | 348/461 |
| 6,343,098 | B1 * | 1/2002 | Boyce | 375/240.03 |
| 6,490,250 | B1 * | 12/2002 | Hinchley et al. | 370/232 |
| 6,735,249 | B1 * | 5/2004 | Karczewicz et al. | 375/240 |
| 6,789,110 | B1 * | 9/2004 | Short et al. | 709/221 |
| 6,885,319 | B2 * | 4/2005 | Geiger et al. | 341/51 |
| 6,920,179 | B1 * | 7/2005 | Anand et al. | 375/240.26 |
| 6,957,350 | B1 * | 10/2005 | Demos | 380/203 |
| 7,103,099 | B1 * | 9/2006 | Paz et al. | 375/240.03 |
| 2001/0047517 | A1 * | 11/2001 | Christopoulos et al. | 725/87 |
| 2002/0136298 | A1 * | 9/2002 | Anantharamu et al. | 375/240.12 |
| 2002/0152317 | A1 * | 10/2002 | Wang et al. | 709/231 |
| 2002/0154691 | A1 * | 10/2002 | Kost et al. | 375/240.01 |
| 2004/0023622 | A1 * | 2/2004 | Mantha et al. | 455/115.1 |
| 2004/0203851 | A1 * | 10/2004 | Vetro et al. | 455/456.1 |

FOREIGN PATENT DOCUMENTS

WO WO 00/07083 * 2/2000

* cited by examiner

*Primary Examiner* — Jason Salce
(74) *Attorney, Agent, or Firm* — Milan Patel; Elaine H. Lo (57) ABSTRACT

Digital multimedia is broadcast by a wireless provider by first decoding incoming multimedia streams and then encoding each stream using one of at least two encoding parameter sets as appropriate for the particular user or groups of users to receive the stream.

115 Claims, 2 Drawing Sheets

MULTIMEDIA TRANSCODING PROXY SERVER FOR WIRELESS TELECOMMUNICATION SYSTEM

CROSS-REFERENCE TO RELATED APPLICATION

This application claims priority from Provisional Application No. 60/454,391, filed Mar. 12, 2003, entitled "Multimedia Transcoding Proxy Server for Wireless Telecommunication System" which is incorporated herein by reference in its entirety.

I. FIELD OF INVENTION

The present invention relates generally to computer-based communication systems.

II. BACKGROUND OF INVENTION

Digital multimedia data such as video and music can be transmitted wirelessly to mobile receivers, such as wireless telephones, for playing of the multimedia by users of the mobile receivers. Such multimedia data may be broadcast by wireless telecommunications systems to mobile stations such as wireless telephones.

Multimedia, which consumes a relatively large amount of bandwidth, may share the wireless spectrum with voice and data calls. This limits the number of users who can be serviced simultaneously. Moreover, because voice calls have priority, during periods of high usage multimedia service may be interrupted, however temporarily, affecting the quality of service provided.

This problem stems in part from the lack of control current wireless service providers have in the generation of multimedia streams. Multimedia streams may be from, e.g., the Internet or other source without any knowledge of the data type being transferred and no control over the characteristics of the multimedia stream being sent. This means that the service provider has no control over the bandwidth requirements of the multimedia stream being requested by and transmitted to a user. For instance, a stream is transmitted in whatever encoded form in which it might have originated, regardless of the preferences or capabilities of the users who are to receive that particular stream and regardless of the current bandwidth situation of the wireless provider. Consequently, a stream might be encoded at too low a compression ratio (i.e., require too much bandwidth) and thus be relatively voluminous, compared to a stream encoded at a higher compression ratio, thereby rendering a higher quality of service than a user might prefer or be able to use, regardless of the bandwidth available to the service provider. As recognized herein, the service provider might have to interrupt such a stream during periods of high usage, whereas the same stream encoded at a higher rate (i.e. using a higher compression ratio, or reduced resolution or reduced picture quality) might not have to be interrupted. Limitations such as mobile device display resolution, color depth, update rate, RAM, CPU speed as well as bandwidth allocation, user preferences, etc. could be used by a service provider to better manager the bandwidth available for all users and thus provide better quality service to a greater number of potential customers. Unfortunately, because the service provider has no control over encoding, such flexibility currently is not possible.

SUMMARY OF THE INVENTION

A communication system includes a decoder receiving incoming encoded multimedia streams and decoding the streams to render decoded streams, and an encoding system that is configured for receiving a decoded stream and encoding it using one of at least two encoding parameter sets to render an encoded stream. A computer determines which encoding parameter set to use to encode a decoded stream, and a wireless transceiver transmits an encoded stream.

Preferably, the computer determines which encoding parameter set to use based at least in part on a system bandwidth, and/or a current available system bandwidth, and/or a wireless mobile receiver capability, and/or a number of users requesting a specific multimedia stream at a designated QoS for that stream, and/or a multimedia data type, and/or a wireless user preference. A user's service classification may be used to generate billing information. Also, characteristics of the encoded multimedia stream, as well as mobile receiver capabilities, can be used to generate billing information.

If desired, one encoding parameter set may be capable of encoding a multimedia stream at a resolution of QCIF or smaller. Another encoding parameter set may be capable of encoding a multimedia stream at a resolution of CIF or larger.

In another aspect, a method for wirelessly providing digital multimedia includes receiving an encoded multimedia stream, and decoding the stream to render a decoded stream. The method also includes selecting at least one of at least two encoding schemes to re-encode the stream at a wireless provider facility to render a re-encoded stream. The re-encoded stream is wirelessly transmitted to a wireless mobile station.

In still another aspect, a wireless provider system includes means for decoding a received encoded multimedia stream, and first means for re-encoding the stream. Second means for re-encoding the stream are also provided. Logic means determine which one of the first and second means for re-encoding to use, based on at least one factor.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
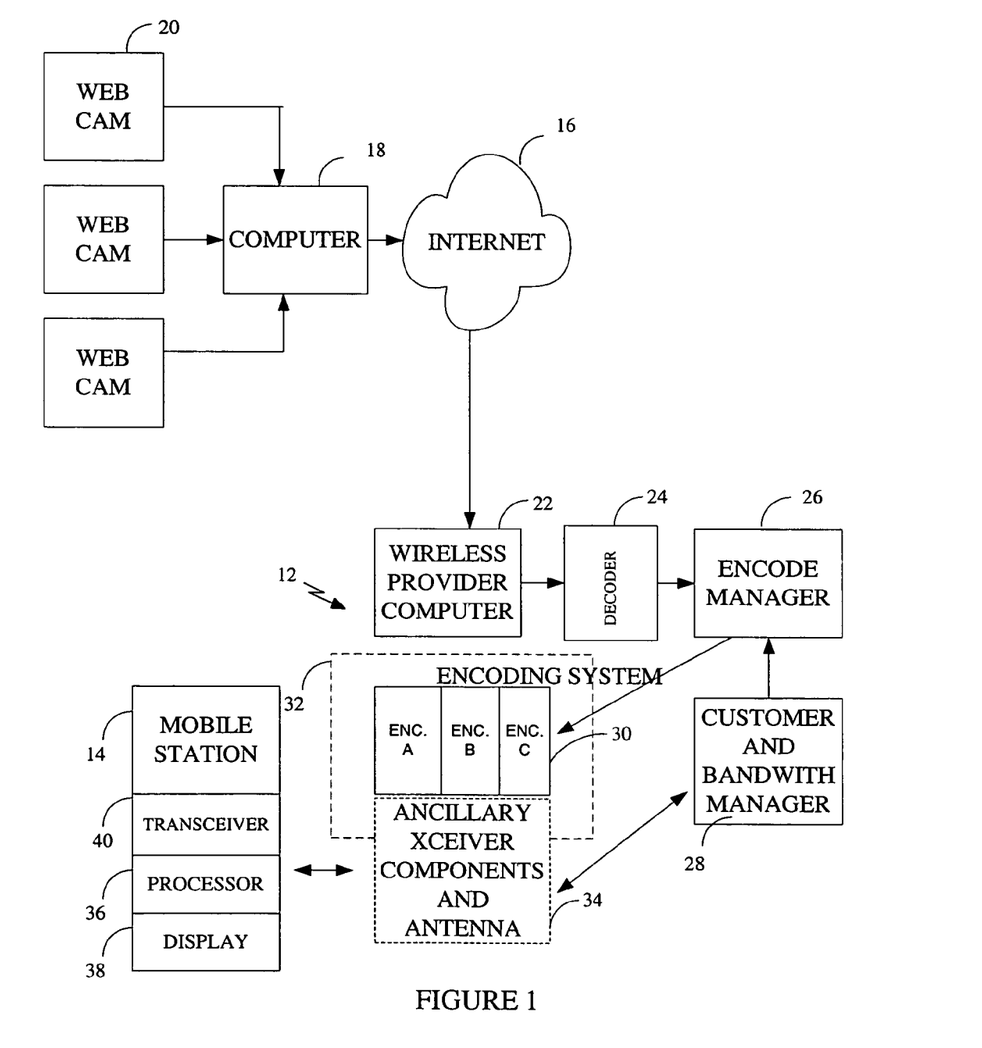
FIG. 1 is a block diagram of the present system.

Referring initially to FIG. 1, a system is shown, generally designated 10, that includes wireless service provider equipment 12 that receives multimedia streams and that transmits the streams wirelessly to mobile stations 14 (only a single station 14 is shown for clarity) in broadcast, multicast, or point-to-point transactions. In a non-limiting exemplary embodiment, the streams may be received from any source, such as, e.g., the Internet 16, and the streams may originate from a multimedia source computer 18 that can process streams generated by multimedia sources such as but not limited to surveillance video Web cameras 20. In the exemplary non-limiting architecture shown in FIG. 1, the source computer 18 may encode multimedia streams from the Web cameras 20 in accordance with encoding principles known in the art prior to sending the streams to the Internet 16.

As shown, the wireless provider member, which can be a network control center, can include a wireless provider computer 22 that communicates with at least one decoder 24 that decodes multimedia streams. The decoder 24 and/or provider computer 22 communicate with an encode manager 26, which receives input from a customer and bandwidth (CB)

manager 28 to select an encoding parameter set to re-encode the decoded stream. Accordingly, the service provider computer 22 is also associated with at least two encoder parameter sets 30 (three sets, labelled A, B, and C, are shown in FIG. 1) that are executed by an encoding system 32. By "encoder parameter set" is meant a set of parameters, relating to characteristics such as but not limited to encoding rate, frame rate, bit resolution, etc., that are used by an encoding algorithm of a software- or hardware-implemented encoder to encode the multimedia streams. The components 22, 26, 28 may be implemented in respective computers or by a single computer.

In one non-limiting embodiment, the encoding system 32 has only one encoder that executes an encoding algorithm or algorithms selectively using the appropriate parameter set 30 as set forth further below. In other embodiments, the encoding system 32 may have plural encoders, with each encoder parameter set 30 being executed by its own respective encoder. Accordingly, each encoder parameter set 30 can be executed by the encoding system 32 to re-encode an input stream in accordance with principles set forth further below in a way that can be different from the original encoding.

Specifically, the service provider system 12 can manage bandwidth by selecting an appropriate encoding set 30 (i.e., encoding parameter set A or B or C, etc.) The CB manager 28 determines the bandwidth that is available for the current requested multimedia stream by examining the current number and types of users using the system. The CB manager 28 can query the multimedia application on the mobile station 14 if desired for quality of service (QoS), resolution and other appropriate device and user requirements and limitations. The CB manager 28 then informs the encode manager 26 of the parameter information needed to start (or reuse) the appropriate encoding parameters for the required multimedia stream. In response, the encode manager 26 implements the appropriate encoding parameter set 30 by starting an encoder in its suite, sending the output of the encoder to ancillary transceiver components and antenna 34. If an existing encoding parameter set is already generating an appropriate stream then the encode manager 26 informs the ancillary transceiver components 34 as to which output to use for this user application. Datastream replication can be performed by either the encoding system 28 or the ancillary transceiver components 34.

In a non-limiting exemplary embodiment, for example a source video stream with video graphics array (VGA) (640× 480 pixels) resolution and a frame rate of thirty frames per second (fps), one encoding parameter set 30 may be executed by the encoding system 28 to re-encode the output video to quarter common intermediate format (QCIF) (176×144 is common in current handheld devices) at ten fps and requiring an average bandwidth (BW) of sixteen kbps (kilo bits per second) another encoding parameter set 30 may be executed by the encoding system 28 to re-encode video at QCIF at fifteen fps and thirty two kbps, and a third set 30 can be used to encode video at size common intermediate format (CIF) (352×288) at fifteen and sixty four kbps, although other encoding types and parameters can be used. For instance, one encoding set 30 may be used to encode data at a low rate (16kbps), one might be used to encode data at an intermediate rate (32kbps), and a third encoding parameter set 30 may be used to encode multimedia data at a high rate (64-128kbps). Or, the different encoding sets might be used to encode different amounts of the stream, e.g., one encoding set might be used to discard an enhancement layer and encode only the base layer of an MPEG4 stream for transmission of the base layer only, whereas another encoding set might be used to encode more than one layer for transmission.

As mentioned above, after re-encoding, the digitized multimedia streams are sent to ancillary wireless transceiver components 34 for processing and wireless transmission in accordance with wireless communication principles known in the art. The transceiver components 34 can use, without limitation, CDMA principles, GSM principles, or other wireless principles including wideband CDMA (WCDMA), cdma2000 (such as cdma2000 1× or 3× air interface standards, for example), TDMA, or TD-SCDMA, and OFDM. The transceiver components 34 might also use broadcast techniques particular to cellular implementations.

As shown, the mobile station 14 includes a processor 36 that drives an audio or video display 38, for presenting the multimedia streams on the display 38. Also, the mobile station 14 includes at least one communication transceiver 40 for communicating with the service provider 12. The mobile station 14 may be a mobile telephone made by Kyocera, Samsung, or other manufacturer that use, in a non-limiting exemplary case, Code Division Multiple Access (CDMA) principles and CDMA over-the-air (OTA) communication air interfaces. The present invention, however, applies to other mobile stations such as laptop computers, wireless handsets or telephones, data transceivers, or paging and position determination receivers. The mobile stations can be hand-held or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

Figure 2:
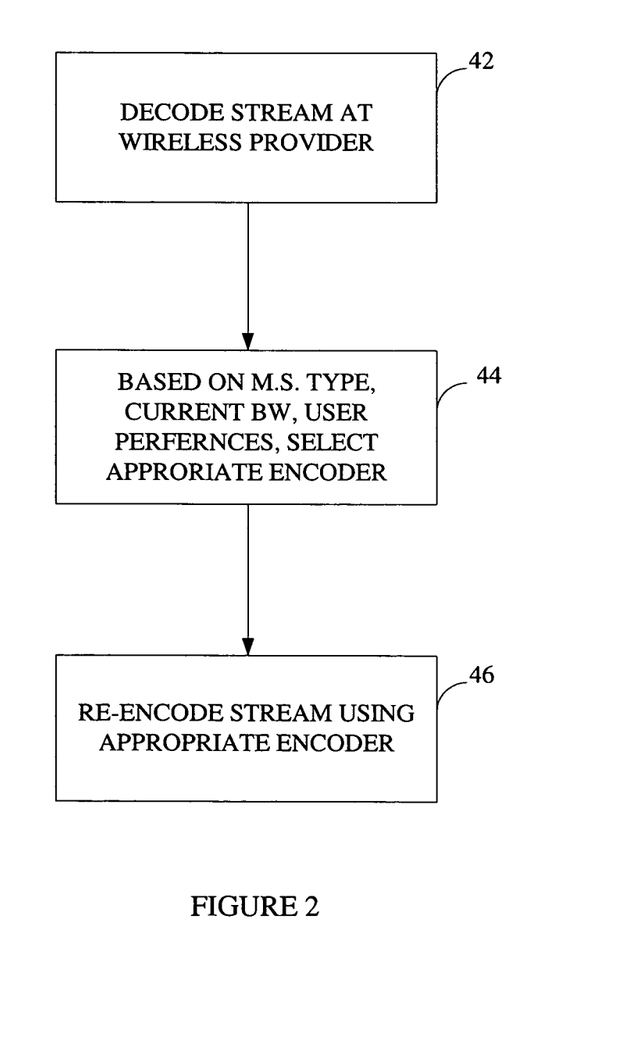
FIG. 2 is a flow chart of the present process.

FIG. 2 shows the logic of the present invention. Commencing at block 42 an incoming multimedia stream (from, e.g., the Internet 16) is decoded by the decoder 24. Moving to block 44, the encode manager 26, in accordance with input received from the CB manager 28, determines which one of the encoding parameter sets 30 will re-encode the stream based on one or more factors as discussed above and as further elucidated on below.

For instance, one exemplary factor includes system bandwidth, such as projected system bandwidth or current system bandwidth. As an example, if the current system bandwidth is relatively unused, a multimedia stream might be re-encoded at a rate that maximizes quality of service (QOS) at the receiving mobile stations 14. On the other hand, if the total system bandwidth is highly allocated, a multimedia stream might be re-encoded at a rate that maximizes data compression at the expense of quality of service at the receiving mobile stations 14. Projected bandwidth based on historical usage can be used in a similar way to anticipate and thus accommodate, e.g., increased system demand. The CB manager 28 is able to reject a request based on limitation of bandwidth, minimum QoS required, etc.

Another exemplary factor includes simplification of mobile receiver device decoder development. For instance, if the web cam or other multimedia stream selected is compressed and/or encoded in a format (call it format X) that is not supported by the mobile device, then a user could not use that stream. If, however, the service provider added a decoder for format X, then the service provider can send out a stream that is encoded in a format that the mobile station can use. This feature also allows the mobile station development and decoder software storage and hardware implementations to be simpler and cheaper.

A further exemplary factor used in determining which encoding parameter set 30 to use might be a wireless user characteristic. For example, if the mobile station 14 to which a particular stream is to be transmitted can use only highly compressed streams, and does not have sufficient system fidelity to use lightly-compressed, high QOS streams, the encoding parameter set 30 that most highly compresses the stream might be selected. On the other hand, a high performance mobile station 14 might be capable of enhancing the display of the multimedia stream if the stream is encoded to maximize QOS. For instance, a high performance mobile station 14 might be capable of displaying a CIF sized video stream because it includes a relatively large display. For such a mobile device, an encoding parameter set 30 which provides the higher resolution could be selected. Conversely, if a mobile station can display only a QCIF image, then an encoding parameter set providing a smaller QCIF image would be selected. Other factors might also effect the selection of encoders such as bits per pixel that can be displayed on the mobile device (it is common for current phone displays to provide only sixteen bits per pixel as apposed to twenty four and thirty two bits per pixel available on typical PC displays), screen refresh rate (current mobile displays can have update rates that are less than seven fps), CPU speed (i.e., a CPU might only have enough MIPS to decode five fps versus ten or fifteen fps), etc. For audio, a receiver may only be capable of mono vs stereo sound (many mobiles have limited speaker and speaker option capability), and many other multimedia device specific factors.

An additional example of a factor used in determining which encoding parameter set 30 to use might be a multimedia data type. More specifically, the re-encoding of a particular stream might be established based on the type of multimedia data it represents. For example, music might be re-encoded using one encoding parameter set 30 that is appropriate for audio encoding while video might be re-encoded using another encoding parameter set 30 that is more appropriate for video.

Further, a user may choose to utilize only select portions of a requested multimedia stream. For example a multimedia stream might include audio, video and text data. A user might not wish to view the video or text but might still want to listen to the audio portion of the stream. The user would indicate this through user preferences communicated to the encode manager 26 to start an audio-only encoding parameter set and by doing so, require significantly less total bandwidth for this multimedia stream for this specific user.

A still further example of a factor used in determining which encoding parameter set 30 to use might be a user preference. Specifically, a user of a mobile station 14 might demand the highest QOS possible, and so multimedia streams sent to that user would be re-encoded with the encoding parameter set 30 providing the highest QOS. The service provider may choose to charge the user a premium for this service option. Another user might demand the lowest cost possible. Multimedia streams sent to such a user might be re-encoded to achieve high compression with lower QOS. The user preference can then be used to generate billing information, with higher demanded QOS being billed at higher rates than lower demanded QOS. In addition, the service provider can choose to alter billing according to data rates used, QoS, current BW availability, system capacity, etc.

When a combination of factors is to be used, the present invention contemplates any number of encoder selection heuristics. For instance, even during periods of high usage of the bandwidth a user demanding high QOS can be serviced as demanded by appropriate selection of an encoding parameter set 30, and perhaps billed more for such service during peak usage times. Or, the opposite principle may be chosen, namely, during periods of high usage, a user might be provided with a basic level of service that might be below that demanded, with the user's bill reduced accordingly. An intermediate strategy might be employed in which, during periods of peak system use, a first user demanding high QOS is given an intermediate QOS by appropriate selection of an encoding parameter set 30 to encode the first user's stream, while other users not demanding any particular QOS are given low QOS by appropriate selection of another encoding parameter set 30 to encode their streams. Further, one or more requested streams which could require substantial bandwidth might be temporarily denied service during peak usage periods in order to allow the service provider to guarantee quality voice service for customers.

Once it has been determined which encoding parameter set 30 to use for a particular multimedia stream, the logic moves to block 46. At block 46, the selected encoding parameter set 30 is used by the encoding system 32 to re-encode the stream for subsequent transmission to one or more mobile stations 14. In this way, the service provider 12 maintains control over the bandwidth used per user, with the re-encoding being dynamically customized for the system bandwidth, user capabilities, or user preferences, or some combination of the above. These principals can also be applied to systems supporting multicast and broadcast over wireless.

While the particular embodiment as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. An apparatus, operable in a wireless communication system, comprising:

a customer manager to determine a first user preference for selective re-encoding of a multimedia stream for a first user and a second user preference for selective re-encoding of the multimedia stream for a second user;

an encode manager included within wireless service provider equipment of the wireless communication system that receives the multimedia stream and selects at least one of a plurality of encoding parameter sets for each of the first and second user preferences in accordance with an encoding scheme, wherein the encoding scheme includes a first scheme based on the first user preference and a second scheme based on the second user preference, wherein the multimedia stream includes a plurality of different types of data, wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, and wherein the first user preference and the second user preference each indicates which of the first, second, third and fourth encoding parameter sets to use when encoding the multimedia stream; and an encoder system included within the wireless service provider equipment for selectively re-encoding the received stream using the selected one of the plurality of encoding parameter sets to output an encoded stream with principles set fourth by the selected one of the plurality of encoding parameter sets, wherein the first user preference specifies a first demand to provide the multimedia stream at a lower quality of service and a lowest billing rate, and the second user preference specifies a second demand to provide the multimedia stream at a higher quality of service and a higher billing rate relative to the first demand, and wherein in response to the first user preference, the encode manager selects one of the plurality of encoding parameter sets that provides a high rate of compression and the lower quality of service at the lowest billing rate, and in response to the second preference, the encoder manager selects one of the plurality of encoding parameter sets that provides the higher quality of service at the higher billing rate.

2. The apparatus of claim 1, wherein the encoding scheme is selected from a group that includes one or more of a scheme based on a system bandwidth, a scheme based on a wireless receiver capability, a scheme based on a number of users requesting a specific multimedia stream at a designated QoS, a scheme based on a multimedia data type, the scheme based on the user preference and a scheme based on characteristics of a mobile station.

3. The apparatus of claim 2, wherein the customer manager uses schemes based on the first and second user preferences to generate billing information for the first and second users.

4. The apparatus of claim 2, wherein the customer manager uses the multimedia data type generated for the first and second users to generate billing information for the first and second users.

5. The apparatus of claim 2, further comprising an encoder for executing the selected one of the plurality of encoding parameter sets for each of the first and second users based on the encoding scheme.

6. The apparatus of claim 2, further comprising a plurality of encoders, each for executing one of the plurality of encoder parameter sets for each of the first and second users.

7. The apparatus of claim 1, wherein the encoder manager includes a bandwidth manager that dynamically determines an available bandwidth for the multimedia stream.

8. The apparatus of claim 1, further comprising a decoder for receiving the multimedia stream and decoding the received stream to output a decoded stream, wherein the encoder system re-encodes the received stream by re-encoding the decoded stream using the selected one of the plurality of encoding parameter sets for each of the first and second users to output the encoded stream differently for each of the first and second users with principles set forth by the respective encoding parameter set.

9. The apparatus of claim 1, wherein the encoder manager comprises a bandwidth manager for selecting the one of the plurality of the encoding parameter sets for each of the first and second users in accordance with the encoding scheme.

10. The apparatus of claim 1, wherein the encoder system comprises an encoder for executing the selected one of the encoding parameter sets for each of the first and second users.

11. The apparatus of claim 1, further comprising a transceiver for wirelessly transmitting re-encoded streams to mobile stations for each of the first and second users.

12. The apparatus of claim 1, wherein the encoding system provides an output configurable for handheld devices that require a first frame rate and a first bandwidth.

13. The apparatus of claim 12, wherein:
the first frame rate is 10 frames per second; and
the first bandwidth is within 16 kilo bits per second.

14. The apparatus of claim 1,
wherein the received stream comprises a stream of a first resolution, and
wherein for the first user the encoding system re-encodes the received stream by re-encoding the stream of a first resolution to a stream of a second resolution, a first frame rate and a first bandwidth.

15. The apparatus of claim 14, wherein:
the first resolution is a video graphics array (VGA) format; and
the second resolution and first frame rate are configured for a handheld device.

16. The apparatus of claim 1, wherein for each of the first and second user preferences, the encode manager selects two or more of the plurality of encoding parameter sets in accordance with the encoding scheme.

17. The apparatus of claim 1,
wherein the first encoding parameter is only for encoding audio data,
wherein the second encoding parameter set is only for encoding video data,
wherein the third encoding parameter set is only for encoding text data, and
wherein for each of the first and second users, the encode manager selects two or more of the first one of the plurality of encoding parameter sets, the second one of the plurality of encoding parameter sets and a third one of the plurality of encoding parameter sets to only encode two or more of an audio type, a video type and a text type of the multimedia stream.

18. The apparatus of claim 1, further comprising a computer configured to receive the multimedia stream from a mobile station.

19. The apparatus of claim 18, wherein the mobile station is operable in the wireless communication system.

20. The apparatus of claim 1, wherein the multimedia stream is received using an over the air communication air interface.

21. The apparatus of claim 1, wherein the multimedia stream is received using an internet connection.

22. The apparatus of claim 1, further comprising a customer manager for generating billing information based on each of the first and second user preferences.

23. The apparatus of claim 1,
wherein the multimedia stream comprise a plurality of different types of multimedia data,
wherein the encoder manager selects the first encoding parameter set for encoding only the first type of the plurality of types of data,
wherein the encoder system re-encodes only the first type of the plurality of types of data using the selected first encoding parameter set, and
wherein the apparatus only sends the re-encoded first type of the plurality of types of data to a requesting device without sending any of the remaining types of the plurality of types of data to the requesting device.

24. The apparatus of claim 1,
wherein the multimedia stream comprises audio, video and text data,
wherein the encoder manager selects the first encoding parameter set for encoding only the audio data,
wherein the encoder system re-encodes only the audio data using the selected first encoding parameter set, and
wherein the apparatus only sends the re-encoded audio data to a requesting device without sending any of the video and text data to the requesting device.

25. A method for providing digital multimedia in a wireless communication system, comprising:
determining with a customer manager of the wireless communication system a first user preference for selective re-encoding of a multimedia stream for a first user and a second user preference for selective re-encoding of the multimedia stream for a second user;
receiving the multimedia stream at an encode manager of the wireless communication system;
selecting at least one of a plurality of encoding parameter sets in accordance with an encoding scheme for each of the first and second user preferences,
wherein the encoding scheme includes a first scheme based on a first user preference and a second scheme based on the second user preference,
wherein the multimedia stream includes a plurality of different types of data,
wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, and
wherein the first user preference and the second user preference each indicates which of the first, second, third and fourth encoding parameter sets to use when encoding the multimedia stream; and
selectively re-encoding, with an encoder system of the wireless communication system, the received stream using the selected one of the plurality of encoding parameter sets to output an encoded stream with principles set fourth by the selected one of the plurality of encoding parameter sets,
wherein the first user preference specifies a first demand to provide the multimedia stream at a lower quality of service and a lowest billing rate, and the second user preference specifies a second demand to provide the multimedia stream at a higher quality of service and a higher billing rate relative to the first demand, and
wherein in response to the first user preference, the encode manager selects one of the plurality of encoding parameter sets that provides a high rate of compression and the lower quality of service at the lowest billing rate, and in response to the second preference, the encoder manager selects one of the plurality of encoding parameter sets that provides the higher quality of service at the higher billing rate.

26. The method of claim 25, further comprising selecting the encoding scheme from a group of encoding schemes that includes one or more of a scheme based on a system bandwidth, a scheme based on a wireless receiver capability, a scheme based on a number of users requesting a specific multimedia stream at a designated QoS, a scheme based on a multimedia data type, the scheme based on the user preference and a scheme based on characteristics of a mobile station.

27. The method of claim 26, further comprising generating billing information for the first and second users using the schemes based on the first and second user preferences.

28. The method of claim 26, further comprising generating billing information for the first and second users based on the multimedia data type generated for the first and second users.

29. The method of claim 26, further comprising executing the selected one of the plurality of encoding parameter sets for each of the first and second users using an encoder.

30. The method of claim 26, further comprising executing the selected one of the plurality of encoding parameter sets for each of the first and second users using a plurality of encoders.

31. The method of claim 25, further comprising receiving the multimedia stream at a decoder and decoding the received stream to output a decoded stream.

32. The method of claim 25, further comprising executing the selected at least one of the encoding parameter sets for each of the first and second users using an encoder.

33. The method of claim 25, further comprising wirelessly transmitting the re-encoded stream for each of the first and second users.

34. The method of claim 25, further comprising generating an output, configurable for handheld devices that require a first frame rate and a first bandwidth.

35. The method of claim 34, wherein:
the first frame rate is 10 frames per second; and
the first bandwidth is within 16 kilo bits per second.

36. The method of claim 25, wherein the received stream includes a stream of a first resolution, and
wherein for the first user the encoding system re-encodes the stream of the first resolution to stream of a second resolution, a first frame rate and a first bandwidth.

37. The method of claim 36, wherein:
the first resolution is a video graphics array (VGA) format; and
the second resolution and first frame rate are configured for a handheld device.

38. The method of claim 36, wherein:
the first frame rate is within 10 to 15 frames per second; and
the first bandwidth is within 16 to 64 kilo bits per second.

39. The method of claim 25, wherein for each of the first and second user preferences, selecting at least one of the plurality of encoding parameter sets comprises selecting two or more of the plurality of encoding parameter sets in accordance with the encoding scheme,
wherein selectively re-encoding the received stream comprises selectively re-encoding the received stream using the selected two or more of the plurality of encoding parameter sets for each of the first and second user preferences.

40. The method of claim 39,
wherein the first encoding parameter is only for encoding audio data,
wherein the second encoding parameter set is only for encoding video data,
wherein the third encoding parameter set is only for encoding text data,
wherein for each of the first and second users, selecting two or more of the plurality of encoding parameter sets includes selecting two or more of the first one of the plurality of encoding parameter sets, the second one of the plurality of encoding parameter sets and the third one of the plurality of encoding parameter sets, and
wherein selectively re-encoding the received stream comprises selectively re-encoding the received stream using the selected two or more of the plurality of encoding parameter sets for each of the first and second users to only encode two or more of an audio type, a video type and a text type of the multimedia stream.

41. The method of claim 25, further comprising receiving the multimedia stream from a mobile station.

42. The method of claim 41, wherein the mobile station is operable in the wireless communication system.

43. The method of claim 25, further comprising receiving the multimedia stream via a communication air interface.

44. The method of claim 25, further comprising receiving the multimedia stream via an internet connection.

45. The method of claim 25, further comprising generating billing information based on each of the first and second the user preferences.

46. An apparatus, operable in a wireless communication system, comprising:
means for receiving, within the wireless communication system, a decoded stream;
means for determining a first user preference for selectively re-encoding the decoded stream for a first user and a second user preference for selective re-encoding of the multimedia stream for a second user;
means for selecting, within the wireless communication system, at least one of a plurality of encoding parameter sets in accordance with an encoding scheme to use for re-encoding the received decoded stream for each of the first and second user preferences,
wherein the encoding scheme includes a first scheme based on the first user preference and a second scheme based on the second user preference,
wherein the decoded stream includes a plurality of different types of data,
wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, and
wherein the first user preference and the second user preference each indicates which of the first, second, third and fourth encoding parameter sets to use when encoding the decoded stream; and
means for re-encoding, within the wireless communication system, the received decoded stream to output an encoded stream in accordance with the selected one of the plurality of encoding parameter sets,
wherein the first user preference specifies a first demand to provide the multimedia stream at a lower quality of service and a lowest billing rate, and the second user preference specifies a second demand to provide the multimedia stream at a higher quality of service and a higher billing rate relative to the first demand, and
wherein the means for selecting at least one of a plurality of encoding parameter sets comprises means for selecting, in response to the first user preference, one of the plurality of encoding parameter sets that provides a high rate of compression and the lower quality of service at the lowest billing rate, and in response to the second preference, one of the plurality of encoding parameter sets that provides the higher quality of service at the higher billing rate.

47. The apparatus of claim 46, further comprising means for selecting the encoding scheme from a group of encoding schemes that includes one or more of a scheme based on a system bandwidth, a scheme based on a wireless receiver capability, a scheme based on a number of users requesting a specific multimedia stream at a designated QoS, a scheme based on a multimedia data type, the scheme based on the user preference and a scheme based on characteristics of a mobile station.

48. The apparatus of claim 47, further comprising means for generating billing information for the first and second users using the schemes based on the first and second user preferences.

49. The apparatus of claim 47, further comprising means for generating billing information for the first and second users based on the multimedia data type generated for the first and second users.

50. The apparatus of claim 47, further comprising means for executing the selected one of the plurality of encoding parameter sets for each of the first and second users using an encoder.

51. The apparatus of claim 47, further comprising means for executing the selected one of the encoding parameter sets for each of the first and second users using a plurality of encoders.

52. The apparatus of claim 46, further comprising means for receiving the multimedia stream at a decoder and decoding the received stream to output the decoded stream.

53. The apparatus of claim 46, further comprising means for executing the selected one of the encoding parameter sets for each of the first and second users using an encoder.

54. The apparatus of claim 46, further comprising means for transmitting the re-encoded stream for each of the first and second users.

55. The apparatus of claim 46, further comprising means for generating an output, configurable for handheld devices that require a first frame rate and a first bandwidth.

56. The apparatus of claim 55, wherein:
the first frame rate is 10 frames per second; and
the first bandwidth is within 16 kilo bits per second.

57. The apparatus of claim 46, wherein the received stream comprises a stream of a first resolution and means for re-encoding the received stream comprises for the first user, means for re-encoding the stream of the first resolution to a stream of a second resolution, a first frame rate and a first bandwidth.

58. The apparatus of claim 57, wherein:
the first resolution is a video graphics array (VGA) format; and
the second resolution and first frame rate are configured for a handheld device.

59. The apparatus of claim 57, wherein:
the first frame rate is within 10 to 15 frames per second; and
the first bandwidth is within 16 to 64 kilo bits per second.

60. The apparatus of claim 46
wherein for each of the first and second user preferences, the means for selecting at least one of the plurality of encoding parameter sets comprises means for selecting two or more of the plurality of encoding parameter sets in accordance with the encoding scheme,
wherein the means for selectively re-encoding the received stream comprises means for selectively re-encoding the received stream using the selected two or more of the plurality of encoding parameter sets for each of the first and second user preferences.

61. The apparatus of claim 60,
wherein the first encoding parameter is only for encoding audio data,
wherein the second encoding parameter set is only for encoding video data,
wherein the third encoding parameter set is only for encoding text data,
wherein for each of the first and second users, the means for selecting two or more of the plurality of encoding parameter sets includes means for selecting two or more of the first one of the plurality of encoding parameter sets, the second one of the plurality of encoding parameter sets and the third one of the plurality of encoding parameter sets, and
wherein the means for selectively re-encoding the received stream comprises means for selectively re-encoding the received stream using two or more of the first, second and third ones of the plurality of encoding parameter sets for each of the first and second users to only encode two or more of an audio type, a video type and a text type of the multimedia stream.

62. The apparatus of claim 46, further comprising means for receiving the multimedia stream from a mobile station.

63. The apparatus of claim 62, wherein the mobile station is operable in wireless communication system.

64. The apparatus of claim 46, further comprising means for receiving the multimedia stream via a communication air interface.

65. The apparatus of claim 46, further comprising means for receiving the multimedia stream via an internet connection.

66. The apparatus of claim 46, further comprising means for generating billing information based on each of the first and second the user preferences.

67. A mobile station, operable in a communication system, comprising:
a transceiver configured to communicate with a wireless provider system; and
a processor for displaying a multimedia stream received from the wireless provider system via the transceiver, wherein the multimedia stream is encoded using a first one of a plurality of encoding parameter sets and a second one of the plurality of encoding parameter sets in accordance with an encoding scheme,
wherein the encoding scheme comprises a first scheme based a first user preference and a second scheme based on a second user preference,
wherein the multimedia stream includes a plurality of different types of data,
wherein the plurality of encoding parameter sets include a first encoding parameter set for encoding only a first type of the plurality of types of data, a second encoding parameter set for encoding only a second type of the plurality of types of data different from the first, a third encoding parameter set for encoding only a third type of the plurality of types of data different from the first and second types and a fourth encoding parameter set for encoding multiple types of the plurality of types of data,
wherein the first user preference and the second user preference each indicates which of the first, second, third and fourth encoding parameter sets to use when encoding the multimedia stream,
wherein the first user preference specifies a first demand to provide the multimedia stream at a lower quality of service and a lowest billing rate, and the second user preference specifies a second demand to provide the multimedia stream at a higher quality of service and a higher billing rate relative to the first demand such that in response to the first user preference, one of the plurality of encoding parameter sets that provides a high rate of compression and the lower quality of service is selected to provide the lowest billing rate, and in response to the second preference, one of the plurality of encoding parameter sets is selected to provide the higher quality of service at the higher billing rate.

68. The mobile station of claimed in 67, wherein the group of encoding schemes includes one or more of a scheme based on a system bandwidth a scheme based on a wireless receiver capability, a scheme based on a number of users requesting a specific multimedia stream at a designated QoS, a scheme based on a multimedia data type, the scheme based on the user preference and a scheme based on characteristics of a mobile station.

69. The mobile station of claim 68, wherein the schemes based on the first and second user preferences are used to generate billing information for the first and second users.

70. The mobile station of claim 68, wherein the multimedia data type generated for the first and second users is used to generate billing information.

71. The mobile station of claim 68, further comprising an encoder for executing the one of the encoder parameter sets for each of the first and second users based on the encoding scheme.

72. The mobile station of claim 68, further comprising a plurality of encoders, each for executing one of the plurality of encoder parameter sets for each of the first and second users based on the encoding scheme.

73. The mobile station of claim 68, further comprising a bandwidth manager for determining the available bandwidth for the multimedia stream.

74. A communication system, comprising:
a customer manager to determine a first user preference for selective re-encoding of a multimedia stream, and a second user preference for selective re-encoding of a multimedia stream;
an encode manager that receives the multimedia stream, wherein the multimedia stream is encoded at a first resolution; and an encoder system that dynamically customizes a re-encoding of the received stream to a second resolution and a third resolution using encoding parameter sets selected from a plurality of encoding parameter sets to selectively render an encoded stream with principles set forth by the selected encoding parameter sets, wherein the selected encoding parameter sets are determined based on an encoding scheme, wherein the encoding scheme comprises a first scheme based on a first user preference and a second scheme based on the second user preference, wherein the multimedia stream includes a plurality of different types of data, wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, wherein the first user preference and the second user preference each indicates which of the first, second, third and fourth encoding parameter sets to use when encoding the multimedia stream, and wherein the first user preference further specifies a first demand to provide the multimedia stream at a lower quality of service and a lowest billing rate, and the second user preference specifies a second demand to provide the multimedia stream at a higher quality of service and a higher billing rate relative to the first demand, and wherein in response to the first user preference, the encoder system selects at least one of the plurality of encoding parameter sets that provides a high rate of compression and the lower quality of service at the lowest billing rate and in response to the second preference, the encoder system selects one of the plurality of encoding parameter sets that provides the higher quality of service at the higher billing rate.

75. A communication system, comprising:
at least one decoder receiving an incoming encoded multimedia stream and decoding the stream to render a decoded stream;
a customer manager to determine a first user preference for selective re-encoding of the decoded stream, and a second user preference for selective re-encoding of a multimedia stream;
at least one encoding system configured for receiving the decoded stream and encoding the decoded stream for first and second users using at least one of a plurality of encoding parameter sets to render an encoded stream;
at least one computer that selects the at least one of the plurality of encoding parameter sets for each of the first and second users based on the first a user preference and the second user preference, wherein the multimedia stream includes a plurality of different types of data, wherein the plurality of encoding parameter sets include a first encoding parameter set for encoding only a first type of the plurality of types of data, a second encoding parameter set for encoding only a second type of the plurality of types of data different from the first, a third encoding parameter set for encoding only a third type of the plurality of types of data different from the first and second types and a fourth encoding parameter set for encoding multiple types of the plurality of types of data, and wherein the first and second user preferences indicate which of the first, second, third and fourth encoding parameter sets to use when encoding the multimedia stream, wherein the first user preference specifies a first demand to provide the multimedia stream at a lower quality of service and a lowest billing rate, and the second user preference specifies a second demand to provide the multimedia stream at a higher quality of service and a higher billing rate relative to the first demand, and wherein in response to the first user preference, the at least one computer selects the at least one of a plurality of encoding parameter sets that provides a high rate of compression and the lower quality of service at the lowest billing rate and in response to the second preference, the encoder system selects one of the plurality of encoding parameter sets that provides the higher quality of service at the higher billing rate; and at least one wireless transceiver for transmitting an encoded stream.

76. The system of claim 75, wherein the computer further determines which of the plurality of encoding parameter sets to use for each of the first and second users based at least in part on a wireless mobile receiver capability.

77. The system of claim 75, wherein the computer further determines which of the plurality of encoding parameter sets to use for each of the first and second users based at least in part on a number of users requesting a specific multimedia stream at a designated QoS for that stream.

78. The system of claim 75, wherein the computer further determines which of the plurality of encoding parameter sets to use for each of the first and second users based at least in part on a multimedia data type.

79. The system of claim 78, wherein a particular user's service classification is used to generate billing information.

80. The system of claim 78, wherein characteristics of the encoded multimedia stream are used to generate billing information.

81. The system of claim 78, wherein mobile receiver capabilities are used to generate billing information.

82. The system of claim 75, wherein at least one of the plurality of encoding parameter sets is capable of encoding a multimedia stream at a resolution of a quarter common intermediate format (QCIF) or smaller.

83. The system of claim 75, wherein at least one of the plurality of encoding parameter sets is capable of encoding a multimedia stream at a resolution of a common intermediate format (CIF) or larger.

84. The system of claim 75, wherein the computer determines which of the plurality of encoding parameter sets to use for each of the first and second user preferences based at least in part on a system bandwidth.

85. The system of claim 75, wherein the computer determines which of the plurality of encoding parameter sets to use for each of the first and second user preferences based at least in part on a current available system bandwidth.

86. A method for wirelessly providing digital multimedia within a wireless communication system, comprising:
receiving an encoded multimedia stream;
decoding the stream to render a decoded stream;
selecting at least one of a plurality of encoding schemes to re-encode the stream at a wireless provider facility to render a re-encoded stream based on a first user preference and render a re-encoded stream based on a second user preference , wherein the multimedia streams includes a plurality of different types of data, wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, wherein the first and second user preferences each indicates which of the first, second, third and fourth encoding parameter sets to use when encoding the multimedia stream, and wherein the first user preference specifies a first demand to provide the multimedia stream at lower quality of service and a lowest billing rate and the second user preference specifies a second demand to provide the multimedia stream at a higher quality of service and a higher billing rate relative to the first demand;

selecting a first one of the plurality of encoding parameter sets that provides a high rate of compression and the lower quality of service at the lowest billing rate and selecting a second one of the plurality of encoding parameter sets that provides the highest quality of service at the higher billing rate; and wirelessly transmitting the re-encoded streams to at least one wireless mobile station.

87. The method of claim 86, wherein the selecting act is undertaken dynamically.

88. The method of claim 86, wherein the selecting act is undertaken based at least in part on a wireless mobile receiver capability.

89. The method of claim 86, comprising using a particular user's service classification to generate billing information.

90. The system of claim 86, comprising using characteristics of the encoded multimedia stream to generate billing information.

91. The system of claim 86, comprising using mobile receiver capabilities is used to generate billing information.

92. The method of claim 86, wherein the selecting act is undertaken based at least in part on a multimedia data type.

93. The method of claim 86, wherein the selecting act is undertaken at least in part based on a bandwidth.

94. A wireless provider system, comprising:
means for decoding a received encoded multimedia stream, wherein the encoded multimedia stream includes a plurality of different types of data;
first means for re-encoding only a first type of the plurality of types of the data;
second means for re-encoding only a second type different from the first type of the plurality of types of the data;
third means for re-encoding only a third type different from the first and second types of the plurality of types of the data;
fourth means for re-encoding multiple types of the plurality of types of the data; and
logic means for determining which one of the first, second, third and fourth means for re-encoding the stream to use for a first user and for a second user, based on a first user preference and a second user preference, wherein the first user preference and the second user preference each indicates which of the first, second, third and fourth means to use when encoding the multimedia stream, and wherein the first user preference further indicates which of the first, second, third and fourth means to use when encoding the multimedia stream based a first demand specified in the first user preference to provide the multimedia stream at lower quality of service and a lower billing rate, and wherein the second user preference specifies a second demand to provide the multimedia stream at a higher quality of service and a higher billing rate relative to the first demand.

95. The system of claim 94, wherein the first and second user preferences include a factor that defines a wireless user characteristic.

96. The system of claim 94, wherein the first and second user preferences include a factor that defines a multimedia data type.

97. The system of claim 94, further comprising means for generating billing information based on a user service classification.

98. The system of claim 94, further comprising means for generating billing information based on characteristics of the encoded multimedia stream.

99. The system of claim 94, further comprising means for generating billing information based on mobile receiver capabilities.

100. The system of claim 94, wherein first and second user preferences include a factor selected from group of factors that include a factor based on a system bandwidth, a factor based on a current available system bandwidth, a factor based on a wireless user characteristic, a factor based on a number of users requesting a specific multimedia stream at a designated QoS a factor based on a multimedia data type and the factor based on the wireless user preference.

101. The system of claim 94, wherein first and second user preferences include a factor that defines a system bandwidth.

102. The system of claim 94, wherein first and second user preferences include a factor that defines a current available system bandwidth.

103. A communication system, comprising:
decoder means for receiving incoming encoded multimedia streams and decoding the streams to output decoded streams;
encoder means for receiving and encoding at least one of the decoded streams using a plurality of encoding parameter sets to output an encoded stream for a first user and an encoded stream for a second user,
wherein the encoder means further includes means for selecting encoding parameters sets based on a first user preference and the second user preference, wherein the multimedia streams include a plurality of different types of data, wherein the plurality of encoding parameter sets include a first encoding parameter set for encoding only a first type of the plurality of types of data, a second encoding parameter set for encoding only a second type of the plurality of types of data different from the first type, a third encoding parameter set for encoding only a third type of the plurality of types of data different from the first and second types and a fourth encoding parameter set for encoding multiple types of the plurality of types of data, wherein the first and second user preferences each indicates which of the first, second, third and fourth encoding parameter sets to use when encoding the multimedia stream, wherein the first user preference specifies a first demand to provide the multimedia stream at lower quality of service and a lowest billing rate, and the second user preference specifies a second demand to provide the multimedia stream at a higher quality of service and a higher billing rate relative to the first demand wherein in response to the first user preference, the encoder means selects a first one of a plurality of encoding parameter that provides a high rate of compression and the lower quality of service at the lowest billing rate and in response to the second user preference, selects a second one of the plurality of encoding parameter sets that provides the highest quality of service at the higher billing rate.

104. The system of claim 103, wherein the encoder means includes means for determining which of the plurality of encoding parameter sets to use for each of the first and second user preferences based at least in part on a wireless mobile receiver capability.

105. The system of claim 103, wherein the encoder means includes means for determining which of the plurality of encoding parameter sets to use for each of the first and second user preferences based at least in part on a number of users requesting a specific multimedia stream at a designated QoS for that stream.

106. The system of claim 103, wherein the encoder means includes means for determining which of the plurality of encoding parameter sets to use for each of the first and second user preferences based at least in part on a multimedia data type.

107. The system of claim 103, wherein the encoder means includes means for determining which of the plurality of encoding parameter sets to use for each of the first and second user preferences based at least in part on a wireless user preference.

108. The system of claim 103, further comprising a billing means for generating billing information based on a particular user's classification.

109. The system of claim 103, further comprising a billing means for generating billing information based on characteristics of the encoded multimedia stream a particular user's classification.

110. The system of claim 103, further comprising a billing means for generating billing information based on mobile receiver capabilities.

111. The system of claim 103, wherein at least one of the plurality of encoding parameter sets comprises an encoding parameter set that is used to encode the multimedia stream at a resolution of a quarter common intermediate format (QCIF) or smaller.

112. The system of claim 103, wherein at least one of the plurality of encoding parameter sets comprises an encoding parameter set that is used to encode the multimedia stream at a resolution of a common intermediate format (CIF) or larger.

113. The system of claim 103, wherein the encoder means further includes means for determining which of the plurality of encoding parameter sets to use for each of the first and second user preferences based at least in part on a system bandwidth.

114. The system of claim 103, wherein encoder means further includes means for determining which encoding parameter set to use for each of the first and second user preferences based at least in part on a current available system bandwidth.

115. The communication system of claim 103, wherein the system comprises wireless service provider equipment that wirelessly communicates re-encoded versions of the multimedia stream to different wireless mobile stations.

\* \* \* \* \*